No. 11,765. Reissued Aug. 15, 1899.
O. M. LACEY.
CONTROLLER FOR ELECTRIC LIGHTS.
(Application filed June 27, 1899.)
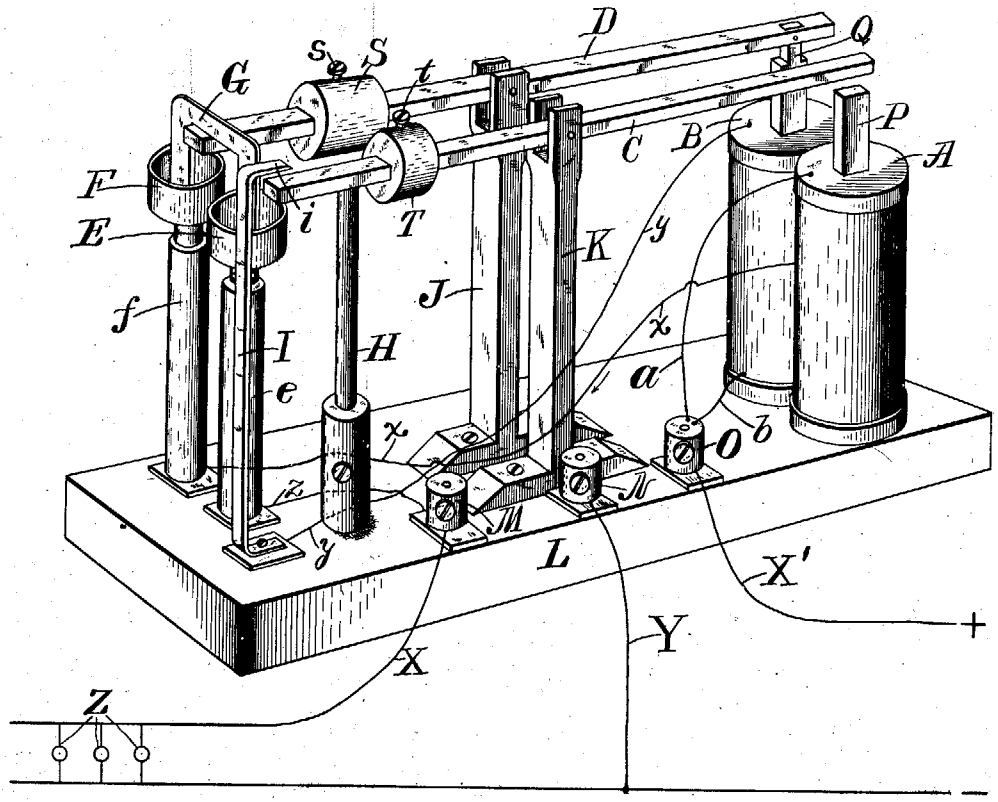
Witnesses
John N. Walk
J. Stephen Kinsla
Inventor
O. M. Lacey,
by Wilkinson & Fisher,
Attorneys.

UNITED STATES PATENT OFFICE.

ORRA MELL LACEY, OF HANFORD, CALIFORNIA.

CONTROLLER FOR ELECTRIC LIGHTS.

SPECIFICATION forming part of Reissued Letters Patent No. 11,765, dated August 15, 1899.

Original No. 625,571, dated May 23, 1899. Application for reissue filed June 27, 1899. Serial No. 722,032.

*To all whom it may concern:*

Be it known that I, ORRA MELL LACEY, a citizen of the United States, residing at Hanford, Kings county, California, have invented a new and useful Improvement in Automatic Controllers for Electric Lights, of which the following is a specification.

My invention relates to improvements in devices that will automatically regulate or control the maximum number of lights that can be used at one time in a house or room.

The purpose of this invention is to enable electric-light companies to make reasonable rates for occupants of flats or dwelling-houses.

The object of my invention is to provide a controller which will, if a greater number of lights than has been agreed upon is used, automatically give notice of this fact and prevent the continued use of an excessive number of lights.

With this object in view my invention consists of the constructions and combinations of parts, as hereinafter described and claimed.

In the accompanying drawing the figure represents a perspective view of my improved controller.

L represents a suitable non-conducting base, preferably of slate. On this base are arranged binding-posts M N O, of the usual construction, adapted to receive the wires X X′ of the line-circuit and a shunt-circuit Y. Near one end of the base-plate L are mounted the electromagnets A and B, provided with cores P Q. Near the center of the base are mounted supports J K, each having a forked upper end. The support J may be of any suitable material; but the support K is of metal and is connected with the binding-post N.

In the support K is pivotally mounted a metallic lever C, one end of which extends over the core P of the electromagnet A, and a sliding weight T, held in position by a set-screw *t*, is mounted upon this lever.

A post H is fastened to the base L under the lever C, and the weight T is placed in such a position on the lever C that said lever will normally rest upon said post. Two metal supports *e* and *f* are secured to the base L near one end thereof, carrying cups E F, which are partially filled with mercury. A strip I, of platinum or other suitable material, is mounted on the base L. The upper part of this strip is bent over and is adapted to contact with the lever C at *i* when said lever is attracted by the electromagnet A.

A lever D, provided with an adjustable weight S, held in position by a set-screw *s*, is pivotally mounted in the support J and one end thereof pivoted to the core Q of the electromagnet B. To the other end of the lever is fastened a bent metal strip G, which is adapted to dip into the mercury in the cups E F.

Z represents the electric lights, which are arranged in multiple arc between the line-wires. The line-wire X′ is connected to the binding-post O, from whence two wires *a b* run, one to each of the electromagnets A B. The wire *x* from the magnet A runs to the support *f*. The wire *y* from the magnet B runs to the strip I, and the wire *z* runs from the support *e* to the binding-post M.

The operation is as follows: The current comes in over the line-wire X′, passes through the wire *a*, the electromagnet A, and wire *x* to the support *f*, up this support, through the strip G, down the support *e*, through the wire *z*, back to the binding-post M, and back through the line-wire X. Supposing, for instance, that the controller is set for three lights, the current flows, as above stated, whether no lights are lighted or whether one, two, or three lights are lighted. If, however, a fourth light is lighted, the resistance is diminished and a stronger current flows through the line-wire. This causes an increased current through the wire *a* and causes the core P to attract the lever C. This completes the shunt-circuit through the strip I and arm C, causing a current to flow through the coil B, which will be caused thereby to attract the arm D by drawing in the core Q. This lifts the strip G out of the mercury in cups E and F and breaks the main circuit, causing the lights to go out. The shunt-circuit passes through the wire *b*, electromagnet B, the wire *y*, the strip I, the lever C, the support K, the wire Y, back to the negative main wire. Then instantly after the main line is broken, as described, the core P will become disengaged and allow the arm C to fall and break the shunt-circuit at *i*, and when the shunt-circuit becomes broken the coil B will cease to energize the core Q, and the main-line circuit will again be made complete through the mercury-cups, when the lamps will light up; but if the overload is still on the operation above described will be repeated, causing the lights to be alternately lighted and extinguished at short intervals until the extra light is turned off. It will be seen that by means of this controller the maximum number of lights that can be used in a room or house can be easily fixed.

Having thus described my invention, what I claim as new, and desire to secure by Letters Patent of the United States, is—

1. The combination of an electric circuit, lights in said circuit, and automatic make-and-break devices, whereby if more lights than a fixed number are traversed by the electric current, said lights will be alternately lighted and extinguished in rapid succession, substantially as described.

2. The combination of a main electric circuit, lights in said circuit, a shunt-circuit and automatic make-and-break devices located in said circuits, the parts being so arranged that an increase of current through said make-and-break devices beyond a certain limit will break and make the main circuit in rapid succession, substantially as described.

3. The combin tion of a main electric circuit, lights in said circuit and automatic make-and-break devices, one being located in each circuit, said main circuit being normally uninterrupted until lights in excess of a certain number are turned on, whereupon the increase of current in the main circuit caused thereby makes the shunt-circuit, breaks the main circuit, breaks the shunt-circuit and makes the main circuit, in rapid succession, substantially as described.

4. The combination of a main circuit, lights therein, a shunt-circuit and an automatic controlling device in each circuit, consisting of an electric magnet, a weighted lever and electrical connections, the parts being so arranged that the passage of a current above a certain strength in the main circuit, will make the shunt-circuit, break the main circuit, break the shunt-circuit and make the main circuit, in rapid succession, substantially as described.

ORRA MELL LACEY.

Witnesses:
JOHN H. HOLT,
J. STEPHEN GIUSTA.